(No Model.)  2 Sheets—Sheet 1.

D. SCHOFIELD.
CAR COUPLING.

No. 378,265.  Patented Feb. 21, 1888.

Witnesses:
David S. Williams
Alex. Barkoff

Inventor:
Daniel Schofield,
by his Attorneys,
Howson & Howson.

(No Model.) 2 Sheets—Sheet 2.

D. SCHOFIELD.
CAR COUPLING.

No. 378,265. Patented Feb. 21, 1888.

Witnesses:
David S. Williams
Alex. Barkoff

Inventor:
Daniel Schofield,
by his Attorneys.
Howson & Howson

UNITED STATES PATENT OFFICE.

DANIEL SCHOFIELD, OF CAMDEN, NEW JERSEY.

CAR-COUPLING.

SPECIFICATION forming part of Letters Patent No. 378,265, dated February 21, 1888.

Application filed January 3, 1888. Serial No. 259,674. (No model.)

*To all whom it may concern:*

Be it known that I, DANIEL SCHOFIELD, a citizen of the United States, and a resident of Camden, Camden county, New Jersey, have invented certain Improvements in Car-Couplings, of which the following is a specification.

My invention relates to that class of car-couplings in which the opposite draw-heads are provided with pivoted levers having projecting arms which engage with each other in order to make the coupling, the object of my invention being to so construct a coupling of this class as to combine the advantages of both a spring-hook coupling and a swinging-hook coupling.

Figure 1:
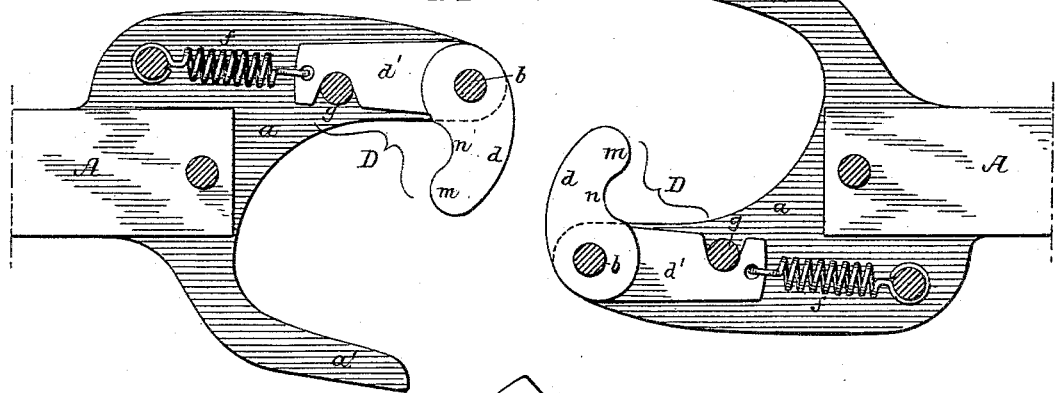
Figure 2:
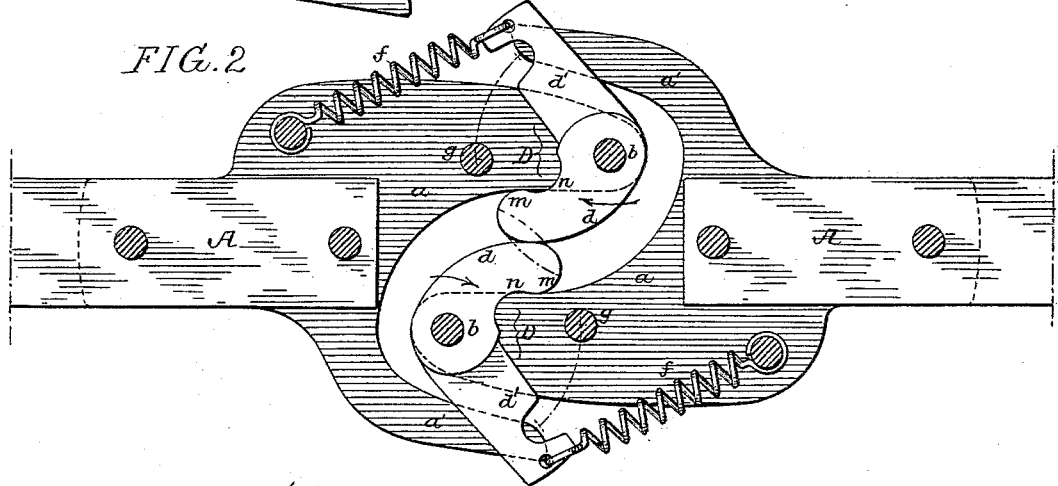
Figure 3:
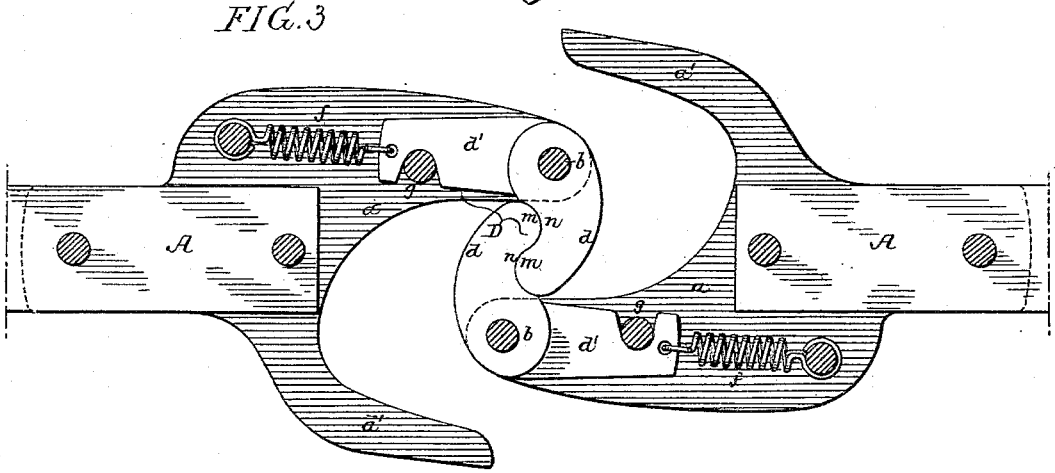
Figure 4:
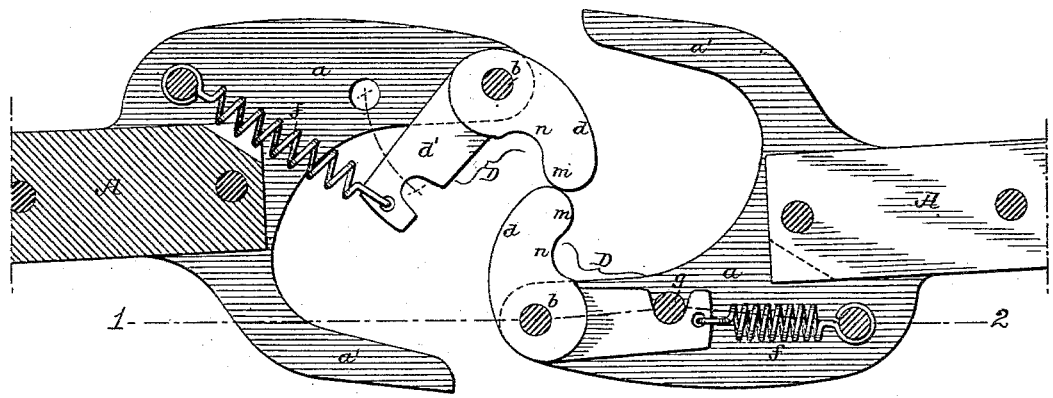
Figure 5:
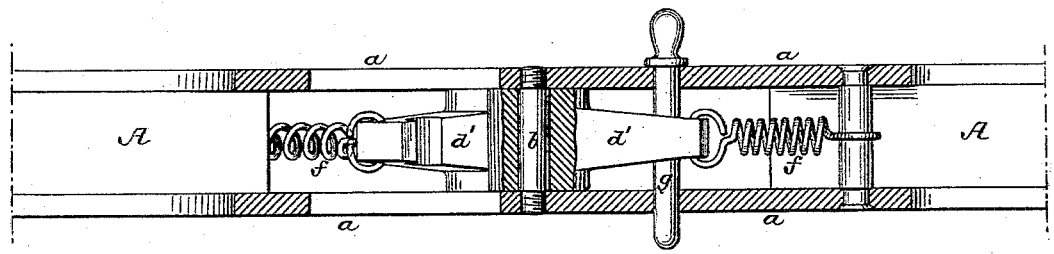
Figure 6:
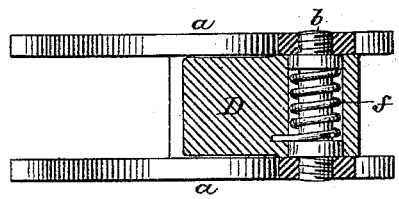

In the accompanying drawings, Figure 1 represents in sectional plan a pair of draw-heads with coupling devices constructed in accordance with my invention, the draw-heads being separated from each other. Fig. 2 is a similar view showing the coupling about to be effected. Fig. 3 is a similar view showing the coupling complete. Fig. 4 is a view showing the method of uncoupling. Fig. 5 is a longitudinal section on the line 1 2, Fig. 4; and Fig. 6 is a view illustrating a modification.

Each draw-head consists of a projecting bar, A, with top and bottom plates $a$ secured thereto and projecting therefrom, each plate having a laterally-projecting guard hook or finger, $a'$, to prevent undue lateral separation of the coupling-heads when the cars are rounding a curve, or are moved sidewise in respect to each other at other times.

To a pin, $b$, on each draw-head is pivoted the coupling-lever D, which is in the form of a bell-crank, having two arms, $d$ $d'$, substantially at right angles to each other, the arm $d$ of each lever being maintained normally in a laterally-projecting position by reason of the action of a spring, $f$, upon the arm $d'$ of the lever, as shown in Fig. 1. When the draw-heads approach each other, however, the backs of the arms $d$ of the two levers strike each other, and said levers are caused to move in the direction of the arrows, Fig. 2, until the arms $d$ pass each other, whereupon the springs $f$ cause the restoration of the levers to their normal positions, so that when the cars are subjected to draft the arms $d$ will engage with each other and couple the cars together, as shown in Fig. 3, any movement of either lever necessary to uncouple being prevented by a pin, $g$, carried by the plates $a$ of the coupling-head and engaging with the arm $d'$ of the coupling-lever, as shown in Fig. 3. It will be seen that owing to this arrangement no manipulation of the parts is necessary in order to effect the coupling, the levers D yielding as the draw-heads approach each other and the springs restoring the levers to the coupling position as soon as they have passed each other.

In order to uncouple, all that is necessary is to withdraw one of the pins $g$, whereupon as the cars are separated the lever will swing open and permit the release of the other lever from engagement therewith, as shown in Fig. 4, the free lever being restored to its normal position by the action of the spring $f$ as soon as the arms $d$ have passed each other. The pin $g$ is then reinserted and the parts are in position for recoupling.

In order to prevent the upper and lower plates of the draw-head from binding upon the levers D, the pivot-pins $b$ of said levers are preferably shouldered, as shown in Fig. 5, so that the pins serve as distance-pieces to prevent clamping of the coupling-levers by the plates of the head.

The inner face of the coupling-arm of each lever D has at the end a rounded projection, $m$, and adjacent thereto a similarly-curved recess, $n$, the projection of one arm fitting into the recess of the other when the levers are coupled. These rounded surfaces facilitate the movement of the arms upon each other when the cars are rounding a curve.

In Fig. 6 I have shown a modified form of spring for operating the coupling-lever, said spring being coiled around the pivot-pin $b$, and being contained in a recess in the lever upon which it acts, so as to maintain it in an intermediate position, or restore it to such position after it has been moved therefrom.

I claim as my invention—

1. The combination of the draw-heads and the coupling-levers pivoted thereto, springs tending to maintain said levers in the intermediate position, and pins engaging with the arms of the levers to prevent uncoupling of the same, all substantially as specified.

2. The combination of the draw-heads, the coupling-levers pivoted thereto and having meeting faces, each consisting of a rounded projection and a rounded recess adjacent thereto, and springs acting on the levers to maintain them in mid-position, all substantially as specified.

3. The combination of the top and bottom plates of the draw-head, the coupling-lever, and the pivot-pin shouldered to prevent binding of said lever by the plates, as set forth.

In testimony whereof I have signed my name to this specification in the presence of two subscribing witnesses.

DANIEL SCHOFIELD.

Witnesses:
WILLIAM D. CONNER,
HARRY SMITH.